(12) United States Patent
Fleischman et al.

(10) Patent No.: US 9,519,678 B2
(45) Date of Patent: Dec. 13, 2016

(54) MANAGING ITEM QUERIES

(71) Applicant: Expedia, Inc., Bellevue, WA (US)

(72) Inventors: David Elias Fleischman, Issaquah, WA (US); Joanne Louise Burger, Seattle, WA (US); Brian Scott Keffeler, Seattle, WA (US); Jeffrey Stewart Miller, Seattle, WA (US); Daniel Harrison Friedman, Mercer Island, WA (US); Glenn Padgett Crowe, Woodinville, WA (US); Vincent Yung, Issaquah, WA (US); Murari Gopalan, Seattle, WA (US); John C Kim, Sammamish, WA (US); Anne Marie Tuazon, Renton, WA (US)

(73) Assignee: EXPEDIA, INC., Bellevue, WA (US)

( * ) Notice: Subject to any disclaimer, the term of this patent is extended or adjusted under 35 U.S.C. 154(b) by 0 days.

(21) Appl. No.: 13/631,768

(22) Filed: Sep. 28, 2012

(65) Prior Publication Data

US 2014/0095524 A1 Apr. 3, 2014

(51) Int. Cl.
*G06F 17/30* (2006.01)
*G06Q 10/02* (2012.01)

(52) U.S. Cl.
CPC ......... *G06F 17/30389* (2013.01); *G06Q 10/02* (2013.01)

(58) Field of Classification Search
CPC ............... G06F 17/30867; G06F 17/30389
USPC .................................................. 707/707, 737
See application file for complete search history.

(56) References Cited

U.S. PATENT DOCUMENTS

| | | |
|---|---|---|
| 8,407,099 B1 | 3/2013 | Frank et al. |
| 8,719,251 B1* | 5/2014 | English et al. ............... 707/713 |
| 2002/0107842 A1* | 8/2002 | Biebesheimer ... G06F 17/30864 |
| 2003/0036930 A1* | 2/2003 | Matos et al. ..................... 705/5 |
| 2005/0192870 A1 | 9/2005 | Geddes |
| 2009/0083226 A1* | 3/2009 | Kawale et al. ................... 707/3 |
| 2009/0216633 A1* | 8/2009 | Whitsett et al. ............... 705/14 |
| 2010/0125492 A1 | 5/2010 | Lin et al. |
| 2010/0168994 A1 | 7/2010 | Bourque et al. |
| 2010/0169131 A1* | 7/2010 | Robertson ......................... 705/5 |
| 2010/0250529 A1 | 9/2010 | Surendran et al. |

(Continued)

OTHER PUBLICATIONS

"An Analysis of travel information searching on the web", Jansen et al., copyright 2008 Cognizant Comm. Corp., Information Technology and Tourism vol. 10.*

*Primary Examiner* — Etienne Leroux
*Assistant Examiner* — Cindy Nguyen
(74) *Attorney, Agent, or Firm* — Knobbe Martens Olson & Bear LLP

(57) ABSTRACT

A network-based service may be provided for facilitating queries for a number of items, such as travel services. A user may submit a query including criteria for determining one or more relevant items. Based on the submitted query, the network-based service may present the user with information regarding the actions of other similar users of the network-based service, such as searches performed by the other users. Based on this information, the user may elect to supplement the current query to conform to the actions for other users. In some embodiments, actions by other users may be based at least in part on a category of the querying user. By presenting actions of similar users, a current user may be enabled to select the most relevant query terms for identifying a desired item.

25 Claims, 9 Drawing Sheets

(56) References Cited

U.S. PATENT DOCUMENTS

2011/0314052 A1    12/2011  Francis et al.
2013/0290324 A1*  10/2013  Gibergues et al. ........... 707/731

* cited by examiner

MANAGING ITEM QUERIES

BACKGROUND

Computing devices and computing networks are frequently employed by users to obtain information and to make purchases. For example, a user may search for, review, and share information regarding items of interest from a network-based information service using his or her personal computing device. In another example, a user may purchase an item of interest from a network-based retailer using his or her personal computing device. Furthermore, network-based services may enable a user to perform these task in the comfort of their home or office and at his or her own pace and convenience.

In some instances, network-based services may provide information regarding a variety of items offered from a variety of sources. For example, a network-based travel service may offer flights, accommodations (e.g., hotels, bed and breakfasts, hostels, resorts, etc.), ground transportation (car rentals, taxis, town cars, trains, shuttles, etc.), or other travel items from a variety of airlines, accommodation providers, rental companies, etc. Further, inventory of each item may be highly volatile, such that the availability of any given travel item (e.g., a specific flight or hotel room) may be altered within a very short time period. In addition, multiple items may be available that meet a user's criteria (e.g., multiple flights or flight combinations to a given destination, multiple hotel rooms within a given city, etc.). However, the search capabilities of a network-based service may not be able to encapsulate all possible combinations of criteria, and therefore may be unable to provide all relevant results to a user based on a given query. Moreover, in some instances, users may be unaware of additional or alternative criteria for locating items on the network-based service.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
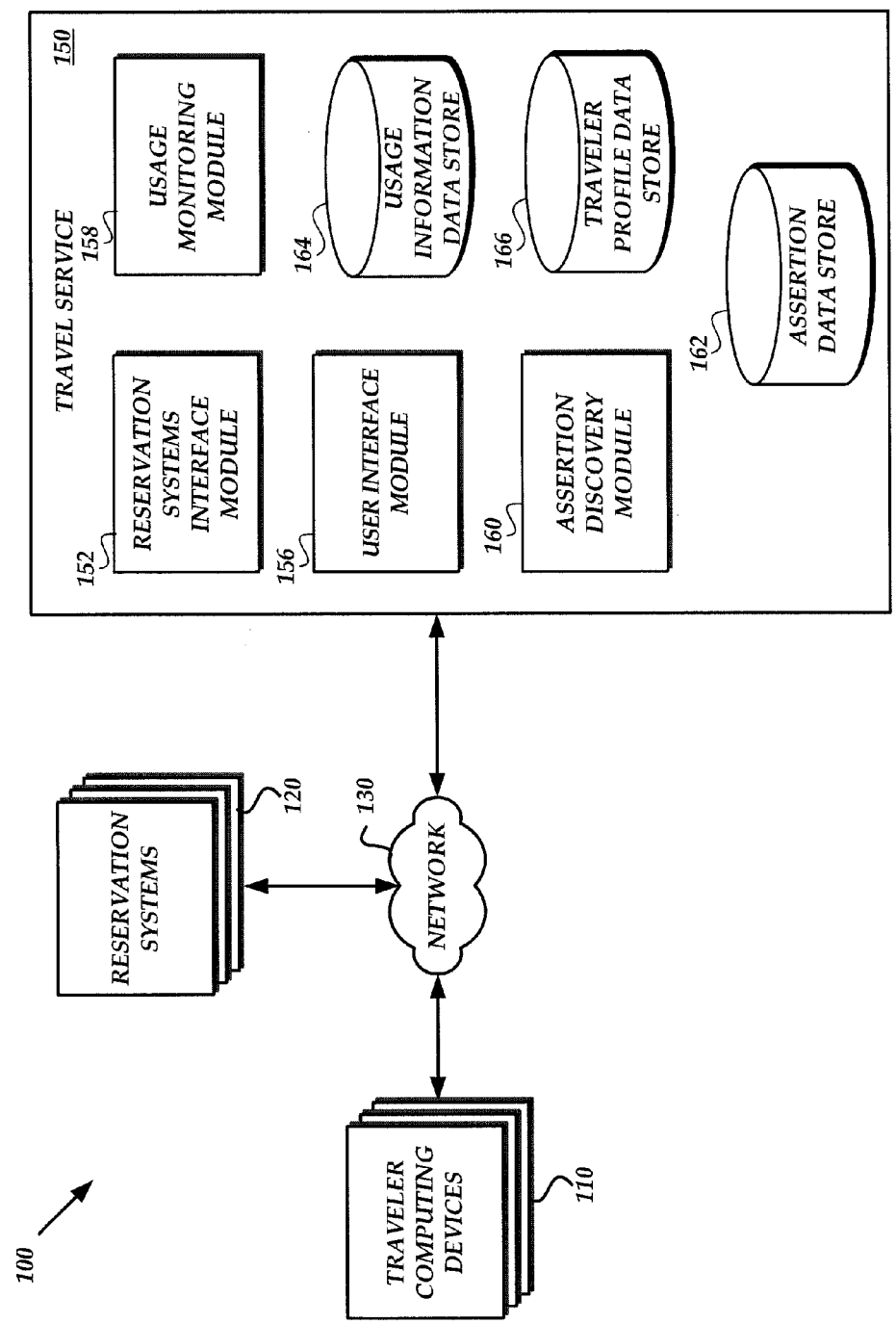
FIG. 1 is a schematic block diagram of an illustrative network environment in which a travel service facilitating delivery of assertions regarding activity of other users may operate.

Generally described, aspects of the present disclosure are directed to managing queries for items offered or provided via network-based services. More specifically, aspects of the present disclosure relate to facilitating the generation of new search queries based on a current query as well as on other queries or information submitted to a network-based service. Illustratively, a network-based service may offer one or more items for acquisition, purchase, or booking. In one embodiment, a network-based service may correspond to a service offering travel items, such as flights, hotels or other accommodations, ground transport, etc. A user of the network-based service may submit a query including criteria for selecting one or more relevant items (e.g., a relevant flight, hotel, rental car, etc.). Thereafter, the service may return any available and relevant items. In addition, the service may return information for facilitating supplementation, expansion, or replacement of the query. Such information may be generated, for example, based on other queries submitted to the network-based service (e.g., by other users), based on previous acquisitions, purchases, or bookings of items on the network-based service, based on information regarding the querying user, based on other additional or alternative information, or any combination thereof.

Illustratively, a user of a network-based travel service (e.g., a service that provides information regarding available travel items from one or more travel item providers) may submit a query for a flight from City A to City B on a given date. Thereafter, relevant flights may be returned to the user for selection. However, in some instances, the number of flights matching the user's criteria may be large, and therefore the travel service may not be able to provide information regarding all relevant flights. Further, in some instances, even when a large number of relevant flights may be presented to the user, the user may not desire to or be unable to locate a most preferred flight from within the presented flights. Accordingly, it may be desirable to enable to user to further refine, alter, or replace the current query. For example, a user may be presented with the option to view only non-stop or direct flights. Alternatively, a user may be presented with the option to view flights on a different date (e.g., to obtain a lower total cost). In some embodiments, presentation of additional or alternative query options may be in the form of recommendations or suggestions. In other embodiments, presentation of query options may be in the form of a statement or assertion. For example, a user may be notified that "of 500 similar users who booked a flight from City A to City B on the given date, 75% booked a non-stop flight." Accordingly, the user may be enabled to select the recommendation or assertion to further refine, alter, or replace the current query. For example, by the selection of the above assertion, the user may be enabled to view only non-stop flights matching the user's criteria. Accordingly, the user may be enabled to better select a relevant item from among a large number of potentially relevant items.

In other embodiments, information provided to a user may enable the user to expand search results for available items. For example, a user may again submit a query for a flight from City A to City B on a given date. However, unbeknownst to the user, a more desirable flight may be available from City A to City C on the given date (e.g., where City C is very close to City B and available flights are less costly, more direct, less lengthy, etc.). Because the user's query criteria did not include flights to City C, the user may not initially be aware of these alternative flights. However, other users of the travel service may have discovered and booked these alternative flights (e.g., when searching for a flight from City A to City B). Therefore, by presenting a querying user with information regarding the bookings of other users, the querying user may be more able to ascertain the available of desirable travel items. For example, in the instance described above, a user may be presented with information that, of customers who searched for a flight from City A to City B on the given date, 82% booked a flight from City A to City C, instead. By selecting such information (e.g., as contained within an assertion or recommendation), the user may be able to view available flights from City A to City C, and determine whether those flights are in fact more desirable than those previously presented in the initial search query. Accordingly, the user may be enabled to expand or replace an initial query based on information of other users of the travel service.

In some embodiments, assertions may include additional information regarding items corresponding to the assertion. For example, an assertion that a large proportion of travels booked a flight from City A to City C (e.g., rather than City B) may include an indication of the lowest or average cost of a flight from City A to City C. Still further, in some embodiments, cost information may be presented relative to costs of a current query. Illustratively, a user may search for flights from City A to City B, and the lowest returned flight may cost $250. In this instance, an assertion may be presented that a large proportion of travelers initially searching for similar flights instead flew to City C. In addition, the travel service may determine that flights from City A to City C during the requested period are available (or were recently available) for as low as $200. Accordingly, the travel service may modify the assertion to reflect that up to $50 may be saved by traveling to an alternate destination (e.g., City C).

In other embodiments, assertions may be personalized to a particular user. For example, assertions may include information regarding actions of one or more contacts (e.g., contacts within the travel service, contacts on a social networking system, contacts of a mobile device or cellular telephone, etc.). For example, a traveler may search for flights from City A to City B, and in return, be presented with an assertion that a majority of their contacts instead traveled from City A to City C. In some instances, assertions regarding contacts may be prioritized above other assertions, such that a traveler is presented with assertions regarding the actions of contacts above or prior to being presented with assertions of general travelers.

As noted above, assertions may be based on previous acquisitions, purchases, or bookings of items on the network-based service, based at least in part on information regarding the querying user, based on other additional or alternative information, or any combination thereof. For example, in some embodiments, assertions may be based on all other users conducting the same or similar query as a querying user. Illustratively, where a user searches for flights from City A to City B on a given date, presented assertions may be based on all queries (e.g., queries by other users or prior queries by the current user) for flights from City A to City B, queries for flights from City A to City B on the given day, or flights from City A to City B on a range of days (e.g., around the given day, on other similar days, etc.). By analyzing these corresponding queries, commonalities may be determined for inclusion in an assertion. For example, in some embodiments, the most frequent actions taken by customers during similar queries may be presented to a user. By way of illustration, when analyzing the similar queries for flights from City A to City B, a travel service may determine that: 82% of users booked a non-stop flight; 55% of users booked a flight departing before 10 AM; 40% of users booked a round-trip flight; and 10% of users booked a flight from City A to City C. Accordingly, users may be enabled to modify or replace their current query with a query conforming to the above determined similarities. Illustratively, upon seeing that 82% of users booked a non-stop flight, a querying user may elect to view only non-stop flights. In some embodiments, only the most significant information may be presented to a querying user. For example, only the top 5 actions (e.g., as determined by a percentage or numbers of users taking the action) may be presented to a user. Alternatively, only actions above a threshold number or percent of users may be presented (e.g., actions taken by more than 35% of users making similar queries, actions taken by more than 50 users making similar queries, etc.).

In some embodiments, multiple sets of relevant queries may be determined for the purposes of determining an assertion, each with varying degrees of relevance with respect to a current query. For example, queries for flights from City A to City B on Jan. 1, 2012 may be more relevant than queries for flights from City A to City B on Dec. 1 through Feb. 1, 2012, which may in turn be more relevant than queries from City A to City B in June of 2011. Each set of relevant queries may be associated with a number of actions taken be querying users, which may be distinct among the query sets. For example, for flights from City A to City B on Jan. 1, 2012, 60% of users may book a non-stop flight, while for flights from City A to City B in July of 2011, only 35% of users may have booked a non-stop flight. In some embodiments, actions from multiple sets of queries may each be presented to a user. In other embodiments, actions from less relevant query sets may be presented to a user only when actions from more relevant query sets are not available.

Still further, in some embodiments, similar queries may be selected based on information associated with the querying user, such as a query category. Illustratively, a query may be placed into a number of categories, such as "business travel," "leisure travel," "family travel," "elite travel," "luxury travel," "economy travel," etc. As will be described in more detail below, a query category may be based on the user's current query or past queries, the user's profile, the user's past action on the travel service or other services, or any combination thereof. For example, a user with a Saturday night stay might be more likely to be classified as a leisure traveler, while a user without a Saturday night stay may be more likely to be classified as a business traveler.

In instances where a query is determined to be of a specific category of queries, assertions presented to the user may be determined based on actions of other queries corresponding to the category. For example, where an elite level business traveler queries for flights from City A to City B, the user may be presented with information specifying that, of all elite level business travelers querying for similar flights, 98% booked non-stop flights. Similarly, where a family leisure traveler queries for the same or similar flights, the user may be presented with information specifying that, of all family leisure travelers querying for the same or similar flights, 25% booked non-stop flights. By presenting information determined based on other similar users, each user may be presented with assertions most relevant to their query.

By presentation of assertions reflecting activity of other users, a querying user may be enabled to recreate such activities. For example, an activity taken by a large proportion of similar users may indicate benefits of that activity which are not otherwise readily apparent. For example, pricing for travel items may vary widely based on the date requested. Further, the inventory of travel items may be extremely volatile, and as such, it may be difficult to maintain an up-to-date record of the lowest priced travel items within a given date. However, many users submit multiple queries in order to locate such a low priced item. Accordingly, by recording aspects of such past user activity via assertions, future users may be enabled to recreate the activities of past users, thereby increasing their changes of locating a desired travel item. In addition, enabling users to recreate activities of past users may further reduce the need for a travel service to constantly analyze travel items in order to determine a most desired item. In effect, the activities of users of a travel service may be more accurate in locating and identifying desirable travel items than typical methods of automated analysis.

Further, because of a volatility of inventory, recommendation of individual travel items may be difficult or undesirable. For example, a specific flight may be available at a specific price to only a limited number of users. Accordingly, by the time the specific flight is recommended to a user (e.g., based on the price), the price of the flight may have increased, or the flight may no longer be available. However, by re-creation of the search which first located the specific flight (e.g., by utilization of an assertion modifying a user's initial search), a user may be more able to ascertain whether any other desirable flights are available. For example, a first specific flight may no longer be available at a desired price, but other flights may have since become available at or near the desired price. Accordingly, aspects of the present disclosure may enable users of services offering volatile items to better locate and acquire items than traditional item recommendation techniques.

Though described herein with respect to specific types of travel services, embodiments of the present disclosure may be applied to any travel item, including but not limited to flights, accommodations, other transportation, activities, tours, travel insurance, day trips, or destination services. Moreover, aspects of the present disclosure may be applied with respect to other item queries, and should not be construed to be limited to travel services unless explicitly stated otherwise.

Moreover, though illustrative examples are provided herein with regard to a specific user queries, in some embodiments, assertions may be provided based on an inferred user query or interest. For example, user located in City A may search for hotels in City B. Based on such activity, it may be inferred that a user would be interested in flights from City A to City B. Based on this inference, assertions regarding a query for flights from City A to City B may be presented to the user. FIG. 1 is a block diagram depicting an illustrative operating environment in which a network-based travel service 150 enables customers to browse, search for, and acquire travel items made available by third party providers or the operator of the travel service 150. As illustrated in FIG. 1, the operating environment includes one or more reservation systems 120 and one or more traveler computing devices 110 in communication with a network-based travel service 150 via a network 130. A third party provider, using a reservation system 120, may make travel items, or information regarding travel items, available to the travel service 150 via the network 130. The travel service 150 may then make the travel items, as well as other travel items, available to traveler computer devices 110. Accordingly, a prospective traveler, using a traveler computing device 110, may browse the travel items available from the travel service 150, search travel items, and acquire, reserve, or book one or more desired travel items.

A traveler computing device 110 may be any computing device, such as a laptop or tablet computer, personal computer, server, personal digital assistant (PDA), hybrid PDA/mobile phone, mobile phone, electronic book reader, set-top box, camera, digital media player, and the like. The reservation systems 120 and the traveler computing devices 120 may communicate with the travel service 150 via a network 130. Those skilled in the art will appreciate that the network 130 may be any wired network, wireless network or combination thereof. In addition, the network 130 may be a personal area network, local area network, wide area network, cable network, satellite network, cellular telephone network, or combination thereof. In the illustrated embodiment, the network 130 is the Internet. Protocols and components for communicating via the Internet or any of the other aforementioned types of communication networks are well known to those skilled in the art of computer communications and thus, need not be described in more detail herein.

The reservation systems 120 may correspond to any systems or devices configured or enabled to allow booking, reservation, or acquisition of travel items. For example, a reservations system 120 may correspond to a centralized reservation system (CRS), a global distribution system (GDS), or any other system where multiple travel item providers, such as airlines, hotels, car rental agencies, cruise lines, bus services, etc., make travel items available for booking, reservation, and/or purchase. In other embodiments, a reservation system 120 may correspond to a system provided by an individual travel item provider (e.g., a specific airline, hotel or hotel chain, car rental agency, cruise line, bus service, etc.). In general, each reservation system may enable other network-based devices, such as devices of the travel service 150 to request information regarding travel items (e.g., availability, price, itinerary, etc.), to search travel items, and to book, acquire, or reserve travel items. Operation of reservation systems is well known within the art, and therefore will not be described in more detail herein.

In the illustrated embodiment, the travel service 150 is illustrated as a computer environment including several computer systems that are interconnected using one or more networks. More specifically, the travel service 150 may include a user interface module 156, a reservation systems interface module 152, a usage monitoring module 158, a usage information data store 164, an assertion discovery module 160, a traveler profile data store 166, and an assertion data store 126. However, it will be appreciated by those skilled in the art that the travel service 150 could have fewer or greater components than are illustrated in FIG. 1. In addition, the travel service 150 could include various Web services and/or peer-to-peer network configurations. Additionally, in some embodiments, the travel service may be implemented by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. Thus, the depiction of the travel service 150 in FIG. 1 should be taken as illustrative and not limiting to the present disclosure.

The reservation systems interface module 152 may facilitate interaction with the reservation systems 120, including searching for relevant travel items, retrieving information regarding travel items, and acquiring travel items. In some embodiments, multiple reservation systems interface modules 152 may be provided, each configured to interact with one or more specific reservation systems 120. For example, a first reservation systems interface module 152 may interact with an airline-based reservation system 120, while second reservation systems interface module may interact with a hotel based reservation system 120. Embodiments of systems and methods for interaction with reservation systems 120 are described within U.S. patent application Ser. No. 12/470,442, filed on May 21, 2009, and entitled "OPTIMIZED SYSTEM AND METHOD FOR FINDING BEST FARE," which is hereby incorporated by reference in its entirety.

The user interface module 156 may facilitate searching, browsing, and acquisition (e.g., by reservation, booking, etc.) of travel items by travelers via traveler computing devices. In some embodiments, the user interface module 156 may include a web server for generation of webpages facilitating such searching, browsing, and acquisition. Examples of a user interfaces that may be generated by a user interface module 156 will be described in more detail in FIGS. 3A-3C, below.

The user interface module 156 may further be configured to store, maintain, and acquire information from a traveler profile data store 166. The user information data store 166 may correspond to any persistent or substantially persistent data store, such as one or more hard disk drives (HDDs), solid state drives (SSDs), or network attached storage devices (NASs). The traveler profile data store 166 may store information regarding users, such as a user's name, age, address, date of birth, credit card information, purchase history, and travel reservations, frequent flyer or rewards program information, etc.

Still further, the user interface module 156 may interact with the usage monitoring module 158 to store usage information of traveler computing devices 110 regarding the travel service 150. For example, the user interface module 156 may transmit information regarding searching, viewing, and acquisition of travel items by travelers to the usage monitoring module 158. The usage monitoring module 158 may transform or otherwise process the information for storage in a data store, such as the usage information data store 162. Illustratively, transformation of the usage information may include anonymization of usage information (e.g., by removal of sensitive or personal information, such as name, address, etc.) or compression of usage information. As will be described in more detail below with respect to FIG. 2A, in some embodiments, the usage monitoring module 158 may further be configured to categorize usage information into a number of relevant categories. For example, a first subset of usage information may be categorized as "business" activities, while a second subset of usage information may be categorized as "leisure" activities. After processing of usage information, the usage information (along with any corresponding categorization information) may be stored within the usage information data store 162. Similarly to the traveler profile data store 166 described above, the usage information data store 162 may correspond to any persistent or substantially persistent data store, such as one or more hard disk drives (HDDs), solid state drives (SSDs), or network attached storage devices (NASs).

The travel service 150 may further include an assertion discovery module 160 configured to determine assertions relevant to a search query, and to retrieve relevant assertions in response to such query. As will be described below, these assertions may be determined based at least in part on usage information (e.g., as stored within the usage information data store 164). Generated assertions may reflect relevant activities taken by other travelers of the travel service 150, such as a type or class of travel item acquired, or specific search terms utilized. For example, an assertion may reflect that, of travelers searching for flights from Miami, Fla. to Cancun, Mexico on Jul. 1, 2013, 60% flew on "Airline A." Accordingly, by reviewing the activities of other travelers, a traveler searching for a flight according to the criteria described above may be enabled to discover queries utilized by other travelers, and recreate such queries quickly. Because an activity taken by a significant number of similar travelers is likely also to benefit the querying traveler, the presentation of assertions allowing re-creation of the specific activity may be of benefit to end users.

After generation of assertions, the assertion discovery module 160 may store assertions for later retrieval, such as in an assertion data store 162. Similarly to the data stores described above, the assertion data store 162 may correspond to any persistent or substantially persistent data store, such as one or more hard disk drives (HDDs), solid state drives (SSDs), and network attached storage devices (NASs).

Though not shown in FIG. 1, in some embodiments, the travel service 150 may include additional or alternative components for interaction with one or more external services, such as social network services. Illustratively, such components may gather information identifying one or more contacts of the user (e.g., for use in determining relevant assertions). Still further, the travel service 150 may include additional or alternative components to determine contacts of the user based at least in part on an address book of the traveler computing device. Because interaction with social networking systems and address books of traveler's devices are well known within the art, these interactions will not be discussed in detail herein.

Figure 2A:
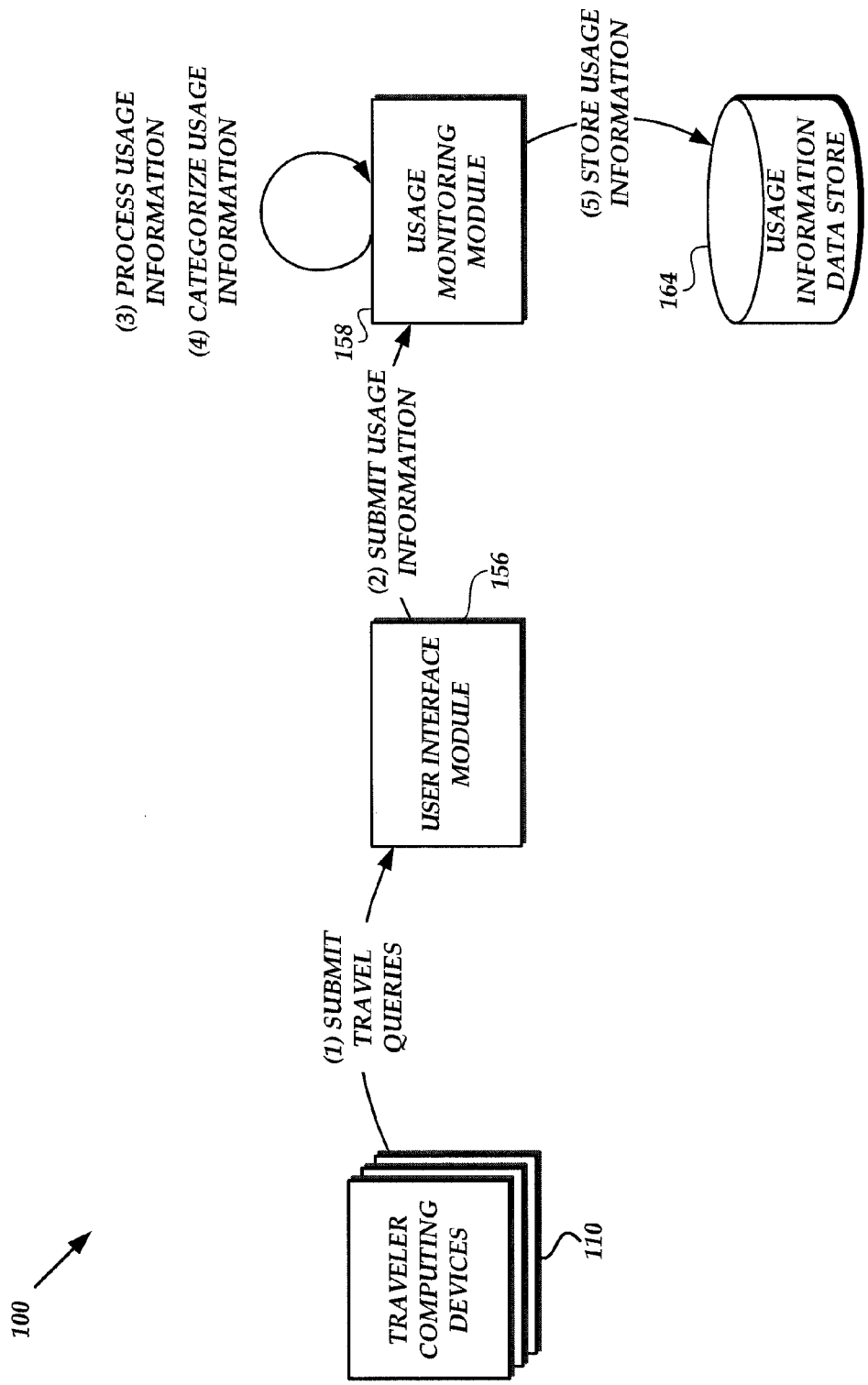
FIGS. 2A-2C are illustrative block diagrams depicting submission of a travel item query to the travel service of FIG. 1, and the return of relevant assertions regarding activity of other users based at least in part on the travel item query.
Figure 2B:
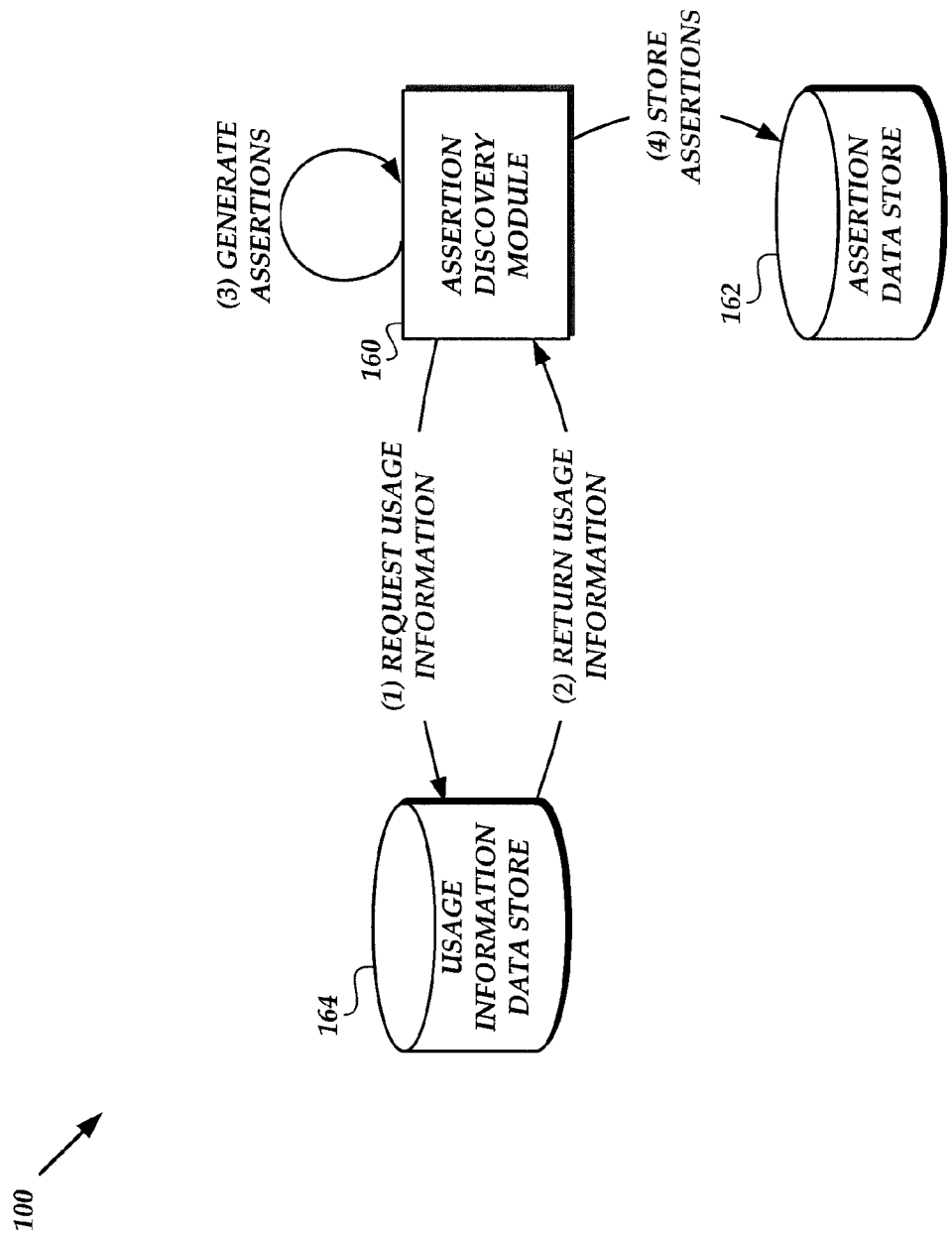
Figure 2C:
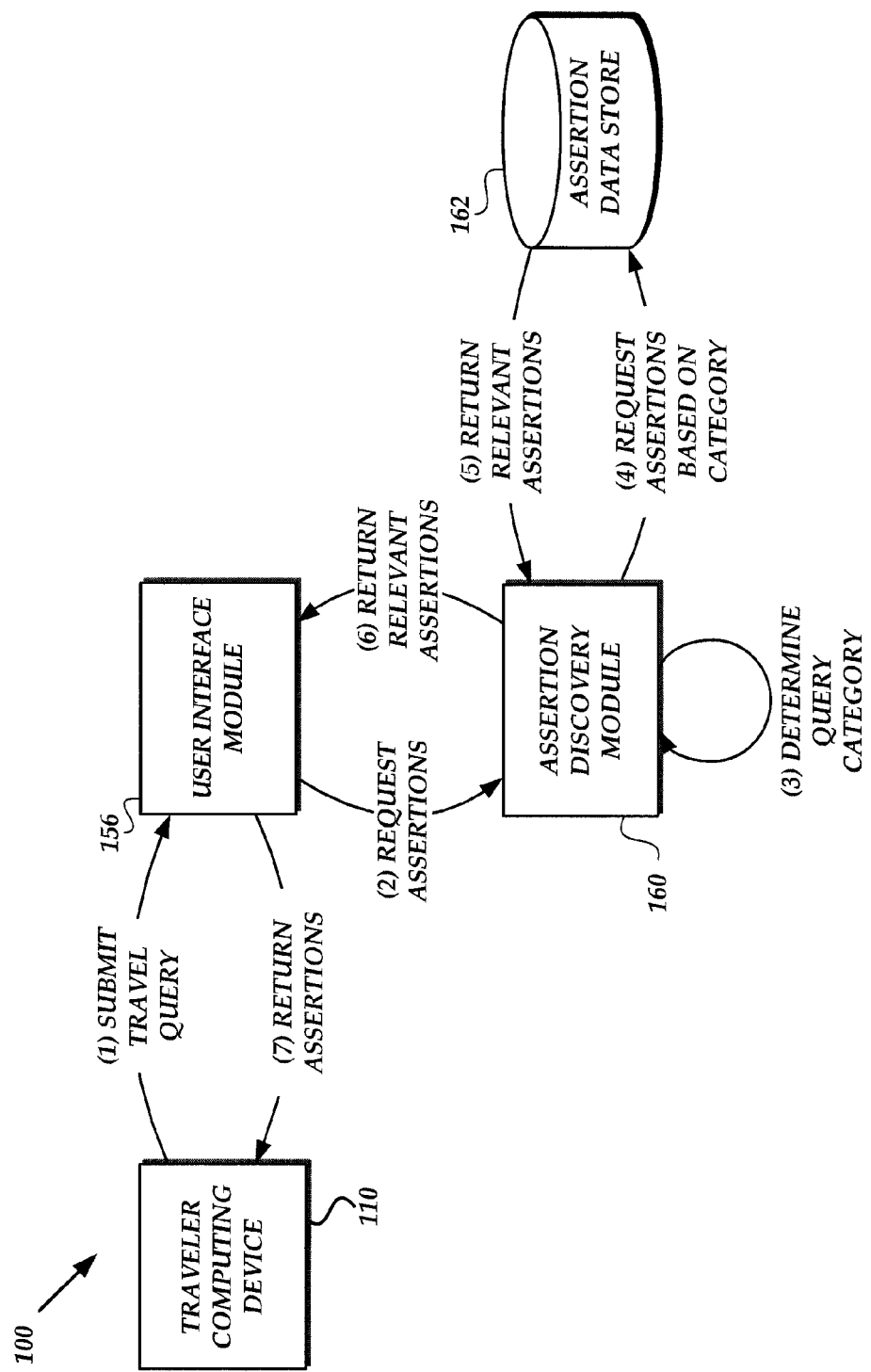

With reference to FIGS. 2A-2C, illustrative interactions for providing assertions based on a query including search criteria will be described. Specifically, with respect to FIG. 2A, an illustrative interaction for submission of a search queries by traveler computing devices 110 to the travel service 150, and for categorization of such search queries by the usage monitoring module 158 will be described. With respect to FIG. 2B, an illustrative interaction for generation of assertions based on submitted search queries as well as other user activity (e.g., acquisition, reservation, or booking of travel items) will be described. With respect to FIG. 2C, an illustrative interaction for providing relevant assertions to a traveler computing device 110 in response to a search query will be described.

With reference now to FIG. 2A, at (1), one or more traveler computing devices 110 may submit travel queries to the user interface module 156. For example, a travel query may correspond to search criteria for location of one or more travel items desired by a traveler computing device 110. For example, a travel query may correspond to a query for flights, hotels, cars, cruises, travel packages, etc. Illustratively, the user interface module 156 may be configured to locate one or more travel items (e.g., by interaction with the reservation systems interface module 152 and one or more reservation systems 120), and to return relevant travel items to the traveler computing devices 110. Because querying for travel items is generally known within the art, the specific interaction for returning relevant travel items will not be discussed in more detail herein.

In accordance with embodiments of the present disclosure, usage information generated by or in response to traveler computing devices 110 may, at (2), be submitted to the usage monitoring module 158. Illustratively, usage information may correspond to the specific search criteria submitted within a traveler query. Still further, usage information may correspond to other activities of the traveler computing devices 110, such as acquisition of travel items (e.g., booking or reservation) on the travel service 150. In some embodiments, usage information may be generated by the user interface module 156 based on information received from the traveler computing devices 110, such as search criteria and requests for acquisition. In other embodiments, usage information may be based at least in part on information received from the traveler computing devices 110. For example, traveler computing devices 110 may be configured to transmit usage information, such as conducted searches, acquisitions, etc., to the user interface module 156 for further transmission to the usage monitoring module 158.

After reception of the usage information by the usage monitoring module 158, the usage monitoring module 158 may, at (3), process the usage information for storage in the usage information data store 162. As described above, in some embodiments, processing may include anonymization of the usage information by removing any personal or sensitive data, such as names, specific addresses, payment information, etc. In some embodiments, anonymization may include generalization of data. For example, a specific address of a traveler may be generalized to a corresponding city, region, zip code, area, etc., while removing reference to the traveler's own address. Still further, in some embodiments, usage information may be compressed or otherwise transformed for future storage in the usage information data store 162.

In some embodiments, the usage monitoring module may be further configured to categorize the usage information prior to storage. Categories may be based, for example, on the specific travel item query, on the traveler making the request, or on other actions taken by the traveler. For example, a query for a flight departing early on a Monday morning, and returning on a Wednesday after five o'clock may be categorized as a query by a "business" traveler. In the instance where the specific traveler frequently acquires travel items through the travel service 150, the query may be categorized as conducted by an "elite business" traveler. Conversely, a query for a flight departing on a Friday and returning on a Sunday evening may be categorized as a "leisure" travel. Any number of categories may be utilized, including, but not limited to, business travelers, leisure travelers, vacation travelers, frequent travelers, travelers of a given distance (e.g., short or long distance, distance based on miles, etc.), international or domestic travelers, or travelers from a given location (e.g., traveling from or residing in a certain city, state, region, country, etc.). In addition, categories may be combined. For example, a category may include "elite international leisure travelers from the east coast of the United States." Generally speaking, the more specific a category, the less usage (e.g., searches and bookings) is likely to be included in the category.

Categorization of usage information, such as conducted searches and acquisition of travel items, may be based on the specific query that resulted in the usage (e.g., the query that facilitated the search, or the query that ultimately lead to acquisition of a travel item). Aspects of a query that may be utilized in order to categorize a given usage include, but are not limited to, the number of travelers searched for, the number of adults or children traveling, the time and date of travel, the length of travel, the provider or brand requested (e.g., airline, hotel chain, etc.), the location of departure or arrival, and the type of travel (e.g., one way, multi-city, round trip, non-stop, one stop, multiple stop). For example, a single traveler may be more likely to be classified as a business traveler than multiple persons traveling together.

As a further example, travel including a weekend may be more likely to be classified as leisure or vacation travel than as business travel. Similarly, non-stop flights may be more likely to correspond to business travel than one stop or multiple stop flights. As yet another example, queries for specific destinations, such as tropical areas, may be more likely to be classified as vacation travels.

Categorization of usage information may further be based on activity of the user or profile data of the user. For example, a user that has recently conducted a large number of searches over a span of many days may be more likely to be classified as a leisure or vacation traveler (e.g., if the recent activity indicates a desire to save money and a flexibility of travel dates). Conversely, a traveler who searches on a single date and acquires a travel item relatively quickly may be more likely to be classified as a business traveler (e.g., if the traveler's company is covering costs of the travel item). Similarly, a traveler that has recently visited a number of different travel services may be more likely to be a leisure or vacation traveler than a business traveler. In some embodiments, profile data of a traveler may further be used to classify activity by the traveler. For example, where acquisition history indicates repeated flights to and from the same location, the user's activity may be more likely to be classified as business activity. Similarly, where acquisition history indicates frequent travel to a number of diverse tropical locations, activity of the traveler may be more likely to be categorized as vacation or leisure travel.

Accordingly, in accordance with embodiments of the present disclosure, the usage monitoring module 158 may be configured to, at (4) categorize each item of usage information (e.g., each submitted search query or travel item acquisition) into one or more categories based on the activity itself, such as the submitted query that resulted in a given search or travel item acquisition. By collection of usage information into one or more categories, the travel service 150 may be enabled to provide future travelers with information specifically targeted to their needs. For example, a traveler submitting a "business" category query may be presented with assertions or other information based on other "business" activity. Still further, collection of usage information into one or more categories may facilitate rapid selection of relevant usage information (e.g., for the creation of assertions) by reducing the amount of usage data returned.

After processing and categorization of the usage information, such usage information may be transmitted at (5) to the usage information data store 164 for storage. As will be described in more detail below, such usage information may be utilized by other aspects of the travel server 150, such as the assertion discover module 160, in order to generate assertions for presentation to traveler computing devices.

With reference now to FIG. 2B, an illustrative interaction for generation of assertions based on usage information within the usage information data store 164 will be described. The interaction of FIG. 2B may be carried out, for example, subsequent to the interaction of FIG. 2A. Specifically, at (1), the assertion discovery module 160 of FIG. 1 may request usage information from the usage information data store 164. In response, at (2), the usage information data store 164 may return the usage information to the assertion discovery module 160.

In some embodiments, the assertion discovery module 160 may be configured to limit the amount of usage information retrieved. Illustratively, the assertion discovery module 160 may limit the retrieved usage information to traveler activities over a specific past period of time (e.g., 30 days). By limiting retrieved usage information, the relevance of assertions generated based on the usage information may be increased. Further, by limiting the retrieved usage information, the computation power required by the assertion discovery module 160 may be reduced.

Thereafter, at (3), the assertion discovery module 160 may generate one or more assertions based on the usage information. As described above, assertions may generally be associated with search criteria or a collection of search criteria. For example, assertions may be created corresponding to a query for a one-way flight from Seattle, Wash. to Dallas, Tex. on Jan. 1, 2013. As a further example, assertions may be created for a set of search criteria. Illustratively, assertions may be created for all queries for one-way flights from Seattle, Wash. to Dallas, Tex. in January of 2013. In some embodiments, generation of assertions may include conducting data analysis of all usage data corresponding to a given set of search criteria, in order to identify any activity shared among more than a threshold number of travelers. In some embodiments, such thresholds may be percentage based (e.g., any activity conducted by more than a given percentage of travelers). In other embodiments, such thresholds may be absolute values (e.g., any activity conducted by more than a given number of travelers). For example, in some embodiments, the assertion discovery module 160 may sort all usage information corresponding to a specific set of search criteria based on assertion types (e.g., alternate or more specific dates, times, flight type, provider, etc.) to determine any collection of traveler activity which exceeds the given threshold. Illustratively, for a for flights departing from Seattle, Wash. on Jan. 1, 2013 and arriving at Dallas, Tex. on Jan. 7, 2012, eighty five percent of travelers may have booked a non-stop flight, which may exceed the threshold requirement of ten percent of traveler activity. Therefore an assertion may be created indicating the amount or percentage of travelers booking a non-stop flight. Conversely, for the same search criteria, only eight percent of travelers may have flown via Airline A. Because eight percent does not exceed the threshold requirement, an assertion would not be created. Accordingly, by analyzing usage information pertinent to a specific set of search criteria, the most relevant assertions corresponding to the set of search criteria may be located and generated.

As described above, in some embodiments, assertions may further be based on a categorization of the usage information. Accordingly, where usage information has been categorized, the assertion discovery module 160 may be configured to generate assertions specific to each category of usage information. Such category specific assertions may be beneficial, for example, where the activities of different categories of users vary widely. Illustratively, a large proportion of usage information with regard to flights from Los Angeles, Calif. to Honolulu, Hi. may be categorized as "vacation" usage information. However, this information may be of relatively little relevant to a traveler attempting to travel between Los Angeles and Honolulu for business purposes. Accordingly, by generating assertions for travel between Los Angeles and Honolulu specifically for business related activities, such a business traveler may be provided with more relevant assertions. Further information regarding generation of assertions will be described in more detail with respect to FIG. 4, below.

After generation of relevant assertions for a given set of search criteria, the assertion may be stored in the assertion data store 162. As will be described below, these assertions may thereafter be retrieved for presentation to a traveler computing device 110 (e.g., in conjunction with results of a query for travel items).

With reference now to FIG. 2C, an illustrative interaction for provision of generated assertions to a traveler computing device 110 based on a travel item query will be described. Specifically, at (1), a traveler computing devices 110 may submit a query for a travel item to the user interface module 156 of FIG. 1. In some instances, a submitted query may be explicit. For example, the traveler computing device 110 may specifically request information regarding items matching a given criteria. In other instances, a submitted query may be implicit or otherwise inferred (e.g., based at least in part on user activity within the travel service 150). For example, a user may view information regarding flights to Seattle, Wash. for a number of days. In such an instance, it may be that the user is also interested in hotels in Seattle, Wash. during those days. Accordingly, a query for hotels in Seattle, Wash. may be inferred, and assertions regarding that query may be presented to the user. In some embodiments, an inferred query may be presented to the user. In other embodiments, assertions may be presented to the user without inclusion of the inferred query. Accordingly, though embodiments may be described herein with reference to explicit queries, assertions may be presented based on explicit, implicit, or inferred queries. After receiving or otherwise determining such a query, the user interface module 156 may, at (2), submit a request to the assertion discovery module 160 for assertions relevant to the travel query.

As described above, in some embodiments, assertions may be divided into a number of categories, based on a type of query received, or a type of traveler making the query. Accordingly, in some embodiments, the assertion discovery module 160 may be configured at (3) to determine a category of the query received from the traveler computing device 110. In general, categorization of a retrieved assertion may be similar to categorization of usage activity. For example, categorization may be based at least in part on the criteria of the received query, on prior activity of the traveler computing device 110, on profile information of the traveler (e.g., as stored within the traveler profile data store 166), or on any combination thereof. Categorization of a query will be described in more detail with respect to FIG. 5, below.

Thereafter, at (4) the assertion discovery module 160 may request relevant assertions from the assertion data store 162. In return, the assertion data store 162 may return the relevant assertions. As described above, assertions may generally correspond to a set of search criteria. For example, a first set of assertions may correspond to searches for flights from Seattle, Wash. to Dallas, Tex. on Jan. 1, 2013, while a second set of assertions may correspond to searches for flights from Seattle, Wash. to Dallas, Tex. in the entirely of January, 2013. Accordingly, where the query received from the traveler computing device 110 is for non-stop flights on Airline A from Seattle, Wash. to Dallas, Tex. on Jan. 1, 2013, both sets of assertions may be relevant. However, relevance of the set of assertions specific to the queried travel date may exceed the relevance of the set of assertions for the entire month in which the travel would occur. Accordingly, in some embodiments, where multiple sets of assertions are determined to be relevant to a received query, the assertion discovery module 160 may be configured to determine only a subset of relevant assertions to be presented to the traveler computing device 110. For example, the assertion discovery module 160 may be configured to attempt to return only the most relevant assertions to the traveler computing devices 110. Relevance of assertions may be based at least in part on a prioritization of categories or types of assertions. Illustratively, in the example given above, assertions associated with the specific date of travel queried may be returned prior to assertions associated with the specific month of travel. In some embodiments, the number of provided assertions may be manually specified. In other embodiments, the number of provided assertions may be specified by the preferences of the traveler computing device 110. In still more embodiments, the number of provided assertions may be based at least in part on the display capabilities of the traveler computing device 110 (e.g., the amount of assertions that are capable of being displayed on one user interface screen).

After determining a set or subset of relevant assertions, the assertion discovery module may, at (6), return the determined assertions to the user interface module 156. The user interface module 156 may thereafter, at (7), return the relevant assertions to the traveler computing device 110 for presentation to the traveler. Illustratively, the interaction of FIG. 2C may be performed in conjunction with an interaction to return travel items relevant to the submitted travel query. Accordingly, though not shown in FIG. 2C, the user interface module 156 may further transmit travel items relevant to the traveler to the traveler computing device 110. As such, the traveler may be enabled to view relevant travel items based on the submitted query, as well as assertions regarding other activity of travelers based on similar queries. Based on such assertions, the traveler may be enabled to modify, alter, or expand their submitted query. For example, a traveler submitting a query for non-stop flights on Airline A from Seattle, Wash. to Dallas, Tex. on Jan. 1, 2013 may be presented with an assertion that, of other users submitting similar queries, ninety percent booked a flight on Airline B (e.g., based on a lower price, greater availability, etc.). Because of the travelers restrictive search criteria, flights for Airline B would not normally be presented, despite the advantages identified by other travelers. As will be described in more detail below, by selecting the presented assertion, the traveler may be enabled to view flights for Airline B, and therefore to ascertain any advantages in such flights, that otherwise would not be presented to the traveler.

Though not shown in FIG. 2C, in some embodiments, the assertion discovery module 160 and/or the user interface module 156 may be configured to determine additional information regarding assertions, such as an average or lowest price of travel items corresponding to the assertion or another difference between items corresponding to the assertion and items returned by the current query. For example, a query for flights from Seattle, Wash. to Dallas, Tex. on Jan. 1, 2013 may be associated with an assertion that many travelers acquired non-stop flights. Accordingly, in some embodiments, the assertion discovery module 160 and/or the user interface module 156 may be configured to determine an average flight time of non-stop flights from Seattle, Wash. to Dallas, Tex. on Jan. 1, 2013. Thereafter, the assertion may be modified to service a lowest or average flight time to the traveler computing device. In some embodiments, the assertion discovery module 160 and/or the user interface module 156 may be configured to determine information regarding assertions by interaction with the reservation systems interface module 152 (e.g., by submitting a query corresponding to the assertion). In other embodiments, the assertion discovery module 160 and/or the user interface module 156 may be configured to determine information regarding assertions by interaction with the usage monitoring module 158 (e.g., to determine an average flight time or other information regarding recently acquired items corresponding to the assertion). Still further, the assertion discovery module 160 and/or the user interface module 156 may be configured to determine a difference between one or more items corresponding to an assertion and one or more items to be returned by the current query. For example, an assertion may reflect the difference between the lowest flight time corresponding to the query and the lowest flight time corresponding to the assertion (e.g., "Travelers who took a non-stop flight saved an average of 2 hours 36 minutes flight time"). Though illustrative examples of additional information regarding an assertion are provided herein, any aspect or information regarding an assertion may be presented in conjunction with the assertion.

In other embodiments, the assertion discovery module 160 and/or the user interface module 156 may be configured to determine assertions associated with contacts of the user (e.g., contacts of the user on the travel service 150, on a social networking service, contacts within an address book or other information on the traveler computer device 110). After determination of such contacts, the assertion discovery module 160 and/or the user interface module 156 may determine a sub-set of the assertions which reflect actions taken by such contacts. Such sub-sets of assertions may be presented to the user instead of, or in addition to assertions regarding general users. For example, a user searching for a flight from Seattle, Wash. to Dallas, Tex., may be presented with an assertion that, of 51 contacts searching for similar flights, 65% flew on Airline A.

With reference to FIG. 3, one example of a user interface 300 for delivery of assertions to a traveler computing device 110 (e.g., in response to a query for travel items) is displayed. As shown in FIG. 3, the user interface 300 enables a traveler computing device 110 to submit travel queries, to view available travel items in response to a submitted travel query, and to view assertions related to the submitted travel query. Illustratively, the user interface 300 may be generated by the user interface module 156 and presented on the traveler computing device 110 by an application, such as a browser application, on the provider computing device 110. In this example, the user interface 300 contains a title reference 302 to the travel service 150, i.e., the "Travel Service," as well as a salutation 304 to the traveler currently visiting the travel service 150. In the illustrated example, the traveler is identified as "Tom Traveler." The user interface 300 further contains a navigation panel 306, which directs the traveler to various other features offered by the travel service 150. Illustratively, units of text within the navigation panel 306 may correspond to interactive links, which modify or change the user interface when selected. In the current example, Tom Traveler has selected link 308, "Flights." Based on this selection, the user interface module 156 has returned the content for user interface 300.

Figure 3A:
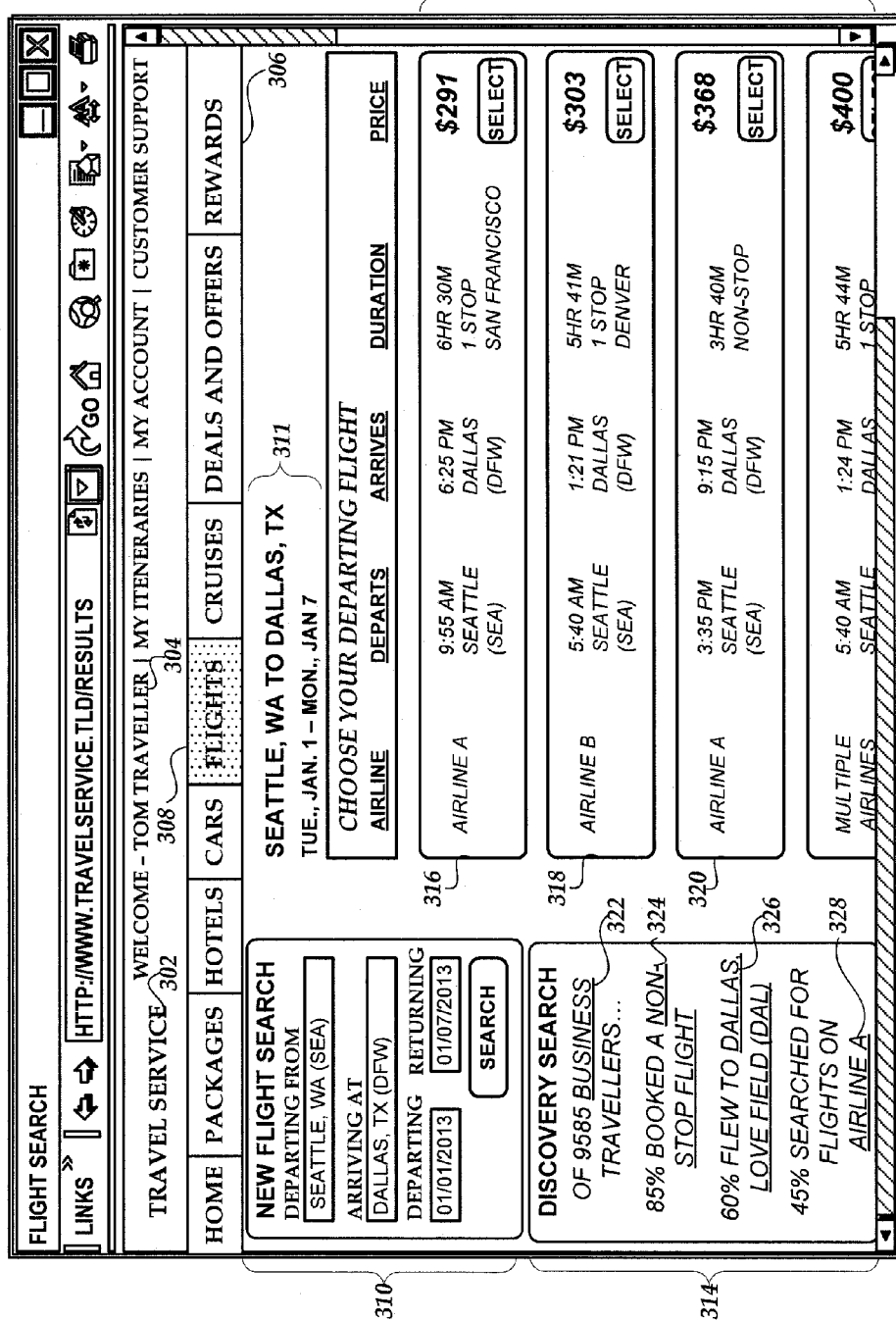
FIGS. 3A-C depict illustrative user interfaces that may be used to facilitate submission of a travel item query to, and delivery of assertions regarding activity of other users from, the travel service of FIG. 1.

By use of the user interface 300, the traveler computing device 110 may submit a travel query to the travel service 150, including criteria for determining relevant travel items. Illustratively, such a query may be submitted by use of the search portion 310 of the user interface 300. As shown in FIG. 3, the search portion 310 enables a traveler to specify criteria for relevant flight travel items, such as departure location and date, and arrival location and date. Though a limited set of search criteria is provided in FIG. 3, one skilled in the art will appreciate that additional or alternative criteria may be specified by the traveler computing device 110, including but not limited to, time of departure or arrival, flight provider, type of travel (e.g., non-stop, one-stop, non-stop), and price. Accordingly, the criteria described with respect to FIG. 3A is intended to be illustrative, and not limiting.

In the illustrative user interface 300, the criteria displayed in the search portion 310 may be reflective of a previous search submitted by the traveler computing device 110. Accordingly, a number of relevant travel items are shown within the results portion 312, including travel items 316-320. Each travel item 316-320 corresponds to a travel item available for acquisition by the traveler. Further, each travel item 316-320 may have been selected based on the submitted search criteria, as reflected by the search criteria potion 311. In the current example, each travel item 316-320 corresponds to a round-trip flight from Seattle, Wash. to Dallas, Tex. on Tuesday, Jan. 1, 2013 and returning Monday, Jan. 7, 2013.

In addition, the user interface 300 includes an assertion display portion 314 that includes assertions 324-328 relevant to the submitted travel query (e.g., as reflected in the search criteria potion 311). Each assertion 324-328 may represent actions of other travelers taken in response to the submitted travel query as reflected in the search criteria potion 311, or in response to similar queries. For example, assertion 324 reflects that, of travelers searching for similar flights, eighty five percent acquired (via booking) a non-stop flight. As a further example, assertion 326 reflects that, of travelers searching for similar flights, sixty percent flew to Dallas, Love Field (DAL) (e.g., instead of Dallas Fort Worth International Airport (DFW)). As a still further example, assertion 328 reflects that, of travelers searching for similar flights, forty five percent searched for flights on Airline A. Though not shown in FIG. 3A, each assertion may provide additional information regarding items corresponding to the assertion. For example, FIG. 3A may be modified to reflect an average or lowest price, duration, etc., of items corresponding to the assertion, or to reflect a difference in items corresponding to the assertion and items corresponding to a current query (e.g., items 316-320). Still further, as described above, additional or alternative assertions may be included within the user interface 300, such as assertions regarding activity of contacts. Illustratively, an assertion may be presented (not shown in FIG. 3) reflecting the number or percentage of social networking contacts that took an activity corresponding to the assertion (e.g., flew on a non-stop flight, flew to Dallas Love Field (DAL), searched for flights on Airline A, etc.).

As described above, in some embodiments, user actions may be divided into a number of categories based at least in part on the action and/or the user performing the action. Specifically, based on aspects of the traveler's query, the traveler's past behavior on the travel service 150 or other services, and based on information regarding the traveler (e.g., profile information within the traveler profile data store 166), the traveler's action (e.g., a submitted query) may be categorized into one of a number of predefined categories. In the illustrative example, the travel service 150 (e.g., via the assertion discovery module 160) has determined that the current query by Tom Traveler is likely representative of a "business" category query, as reflected by display element 322. Accordingly, the assertions 324-328 may be reflected of other "business" actions taken by travelers on the travel service 150, rather than all actions taken by users in general. In some embodiments, display element 322 may be selectable by a traveler in order to modify a currently selected category. For example, the travel service 150 may initially classify Tom Traveler's search as "business," but Tom Traveler may in fact be traveling for leisure purposes. Accordingly, in response to selection of display element 322, Tom Traveler may be presented with a number of possible categories (e.g., including "leisure"). Though not shown in FIG. 3A, by selection of an alternative category, the assertions 324-328 may be modified to reflect assertions relevant to the selected category.

As described above, each assertion may generally reflect actions taken by other travelers based on the same or similar search criteria. Accordingly, the immediate traveler, Tom Traveler, may be enabled to view actions taken by a significant number of similar travelers. These actions may reflect aspects of travel items not immediately recognizable based on generally submitted search criteria. For example, assertion 324 (that eighty five percent of travelers acquired a non-stop flight) may reflect a significant time savings for non-stop flights versus other flights, without significant price savings. Similarly, assertion 326 (that sixty percent of travelers flew to Dallas, Love Field (DAL)) may reflect better flight availability or better costs. Because assertions are based on the activities of users, rather than any perceived benefit of the activity, the travel service 150 is not required to actively correlate activities with perceived benefits. Rather, it may be assumed that, in the majority of situations, activities with beneficial aspects (e.g., low cost, low time commitment, etc.), are more likely to be performed by a large number of users. Accordingly, by tracking the activities of a significant number of users, beneficial activities may be provided to travelers without requiring analysis as to the benefits of the activity.

In some embodiments, however, it may be beneficial to present travelers with perceived benefits of a given activity (e.g., searching for or acquiring a travel item). Accordingly, in some embodiments, the travel service 150 may be configured to request information from travelers as to why a particular activity was undertaken. For example, the travel service 150 may, at the time of booking a flight, request that the booking traveler specify a reason for booking the flight (e.g., low cost, short flight time, good seating availability, etc.). Though not shown in FIG. 3A, in some such embodiments, this information may be provided along with the relevant assertion. For example, assertion 324 may reflect that eighty five percent of travelers booked a non-stop flight because of the short duration of such flights as compared to one-stop or multi-stop flights.

In the user interface 300 of FIG. 3A, each assertion 324-326 may be selectable by a user to modify or alter their current query based on the assertion. For example, assertion 324 may be selectable by Tom Traveler to modify the currently submitted query to return only non-stop travel items. Similarly, assertion 326 may be selectable by Tom Traveler to modify the currently submitted query to return only flights from Seattle, Wash. to Dallas Love Field (DAL) in Dallas, Tex. Still further, assertion 328 may be selectable by Tom Traveler to modify the currently submitted query to return only flights on Airline A. Examples of user interfaces displaying such modified searches will now be described with reference to FIGS. 3B and 3C.

Figure 3B:
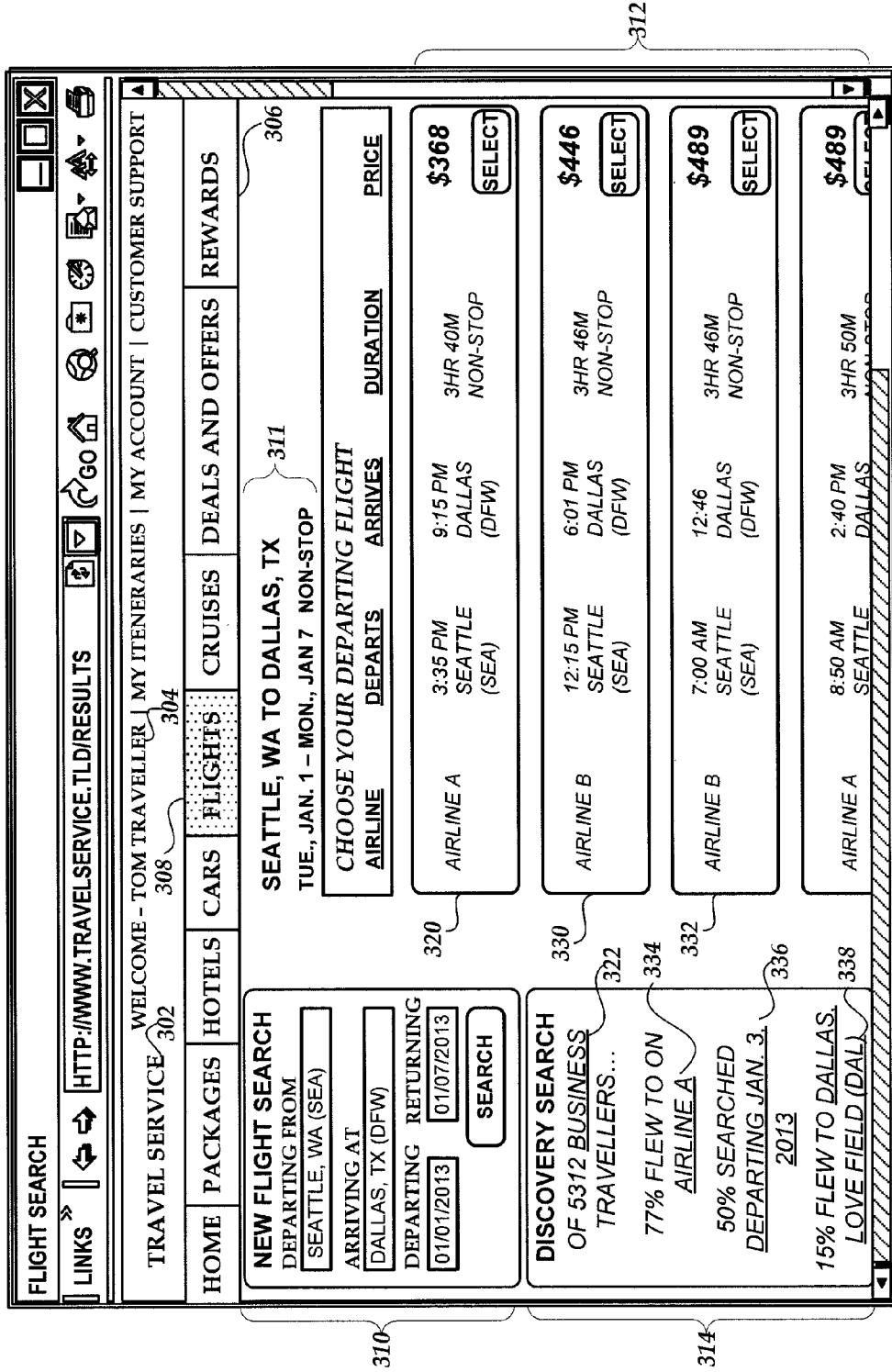

With reference now to FIG. 3B, a modified version of the user interface 300 of FIG. 3A will be described. Because many display elements of FIG. 3B are similar to those of FIG. 3A, they will not be described in detail with respect to FIG. 3B.

In one embodiment, the user interface 300 of FIG. 3B may be displayed in response to selection of assertion 324 of FIG. 3A (asserting that eighty five percent of business travelers booked a non-stop flight). Accordingly, the user interface 300 of FIG. 3B may be modified to augment the search of FIG. 3A with the additional criteria that only non-stop flights be desired. This may be reflected in the modified search criteria 311, as well as in the relevant travel items 320, 330, and 332. Specifically, each of the travel items 320, 330, and 332 now reflect non-stop flights. Accordingly, by selection of an assertion, such as assertion 324 of FIG. 3A, Tom Traveler may be enabled to view only travel items relevant to the displayed assertion.

In addition, because the search criteria 311 submitted by Tom Traveler have been modified based on the selected assertion, new assertions 334-338 may be presented. Similarly to the assertions 324-328 of FIG. 3A, assertions 334-338 may represent actions taken by other travelers of the travel service 150 in response to the submitted query (e.g., a non-stop, round-trip flight from Seattle, Wash. to Dallas, Tex. on Tuesday, Jan. 1, 2013 and returning Monday, Jan. 7, 2013). Because a "non-stop" aspect has been added to Tom Travelers initial query, Tom is now presented with assertions for other travelers searching for non-stop flights. Specifically, assertion 334 reflects that, of users searching for non-stop flights similar to those requested by Tom Traveler, seventy seven percent booked a flight on Airline A. Similarly, assertion 336 reflects that, of travelers submitting queries similar to Tom's, half searched for a departure date of Jan. 3, 2013, rather than Jan. 1, 2013. Still further, assertion 338 reflects that fifteen percent of similar travelers flew to Dallas Love Field in Dallas, Tex. As described above, each assertion 334-338 may be selectable by Tom Traveler to further refine or modify a current search. For example, Tom Traveler may select assertion 336 to view non-stop flights on departing on Jan. 3, 2013, rather than Jan. 1, 2013 (as initially specified).

Figure 3C:
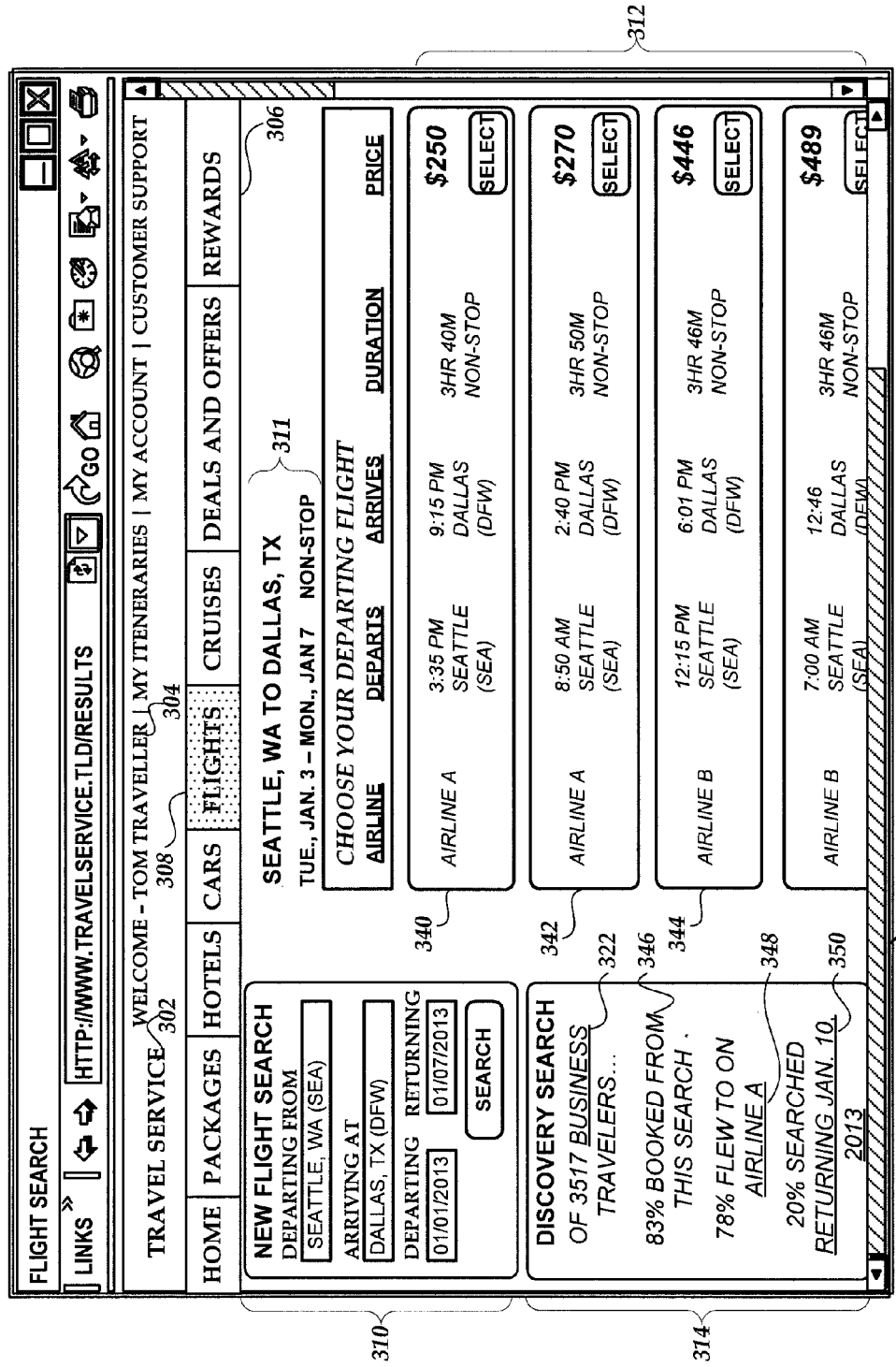

With reference now to FIG. 3C, version of the user interface 300 of FIGS. 3A and 3B, as modified by selection of the assertion 336, will be described. As noted above, because many display elements of FIG. 3C are similar to those of FIGS. 3A and 3B, they will not be described in detail with respect to FIG. 3C.

Specifically, the user interface 300 of FIG. 3C may be displayed in response to selection of assertion 336 of FIG. 3B (asserting that half of business travelers booked a departure flight on Jan. 3, 2013, rather than Jan. 1, 2013). Accordingly, the user interface 300 of FIG. 3C may be modified to reflect the search of FIG. 3B as modified by a different departure date. This may be reflected in the modified search criteria 311, as well as in the relevant travel items 340-344. Specifically, each of the travel items 340-344 now reflect flights departing on Jan. 3, 2012. Accordingly, by selection of the assertion 336 of FIG. 3B, Tom Traveler may be enabled to view only travel items relevant to the displayed assertion.

In addition, because the search criteria 311 submitted by Tom Traveler have been modified based on the selected assertion, new assertions 346-350 may be presented. Similarly to the assertions 324-328 of FIG. 3A and assertions 334-338 of FIG. 3B, assertions 346-350 may represent actions taken by other travelers of the travel service 150 in response to the submitted query (e.g., a non-stop, round-trip flight from Seattle, Wash. to Dallas, Tex. on Thursday, Jan. 3, 2013 and returning Monday, Jan. 7, 2013). Because the departure date of Tom's query has been modified, Tom is now presented with assertions for other travelers searching for flight departing on Jan. 3, 2012. Specifically, assertion 346 reflects that, of users searching for non-stop flights similar to those requested by Tom Traveler, eighty three percent booked a flight based on the submitted query, without further modification. Similarly, assertion 348 reflects that, of travelers submitting queries similar to Tom's, seventy eight percent searched for flights on Airline A. Still further, assertion 350 reflects that twenty percent of similar travelers searched for flights returning Jan. 10, 2013. As described above, each assertion 346-350 may be selectable by Tom Traveler to further refine or modify a current search.

However, in the immediate instance, inclusion of assertion 346 may reflect than many travelers choose not to further modify or refine a current search, but rather book a travel item based on the current search. Similarly, Tom Traveler may find that his desired travel item has been made available within the current search (e.g., as one of the travel items 340-344). In such an instance, Tom Traveler may select the desired travel item for further booking on the travel service 150. Because the process of acquiring and booking a specific travel item is generally known within the art, further description will not be included herein.

Though an illustrative user interface 300 is described above with respect to FIGS. 3A-3C, assertions may be provided to a user via any number of or type of interfaces. For example, as described above, in some embodiments, queries may be implicit within or otherwise inferred based on user activity (e.g., on prior services, on the travel service 150, etc.). Accordingly, assertions may be included within any user interface from which a query can be determined. For example, as described above, a traveler viewing information on hotels in a given city may be inferred to be interested in flights to the city. Accordingly, assertions may be provided based at least in part on such an inferred search within the user interface containing information regarding the hotel is provided. Still further, in some embodiments, assertions may be provided via other interfaces, such as application programming interfaces (APIs). Accordingly, the user interface 300 of FIGS. 3A-3C should be viewed as illustrative, and not limiting.

Figure 4:
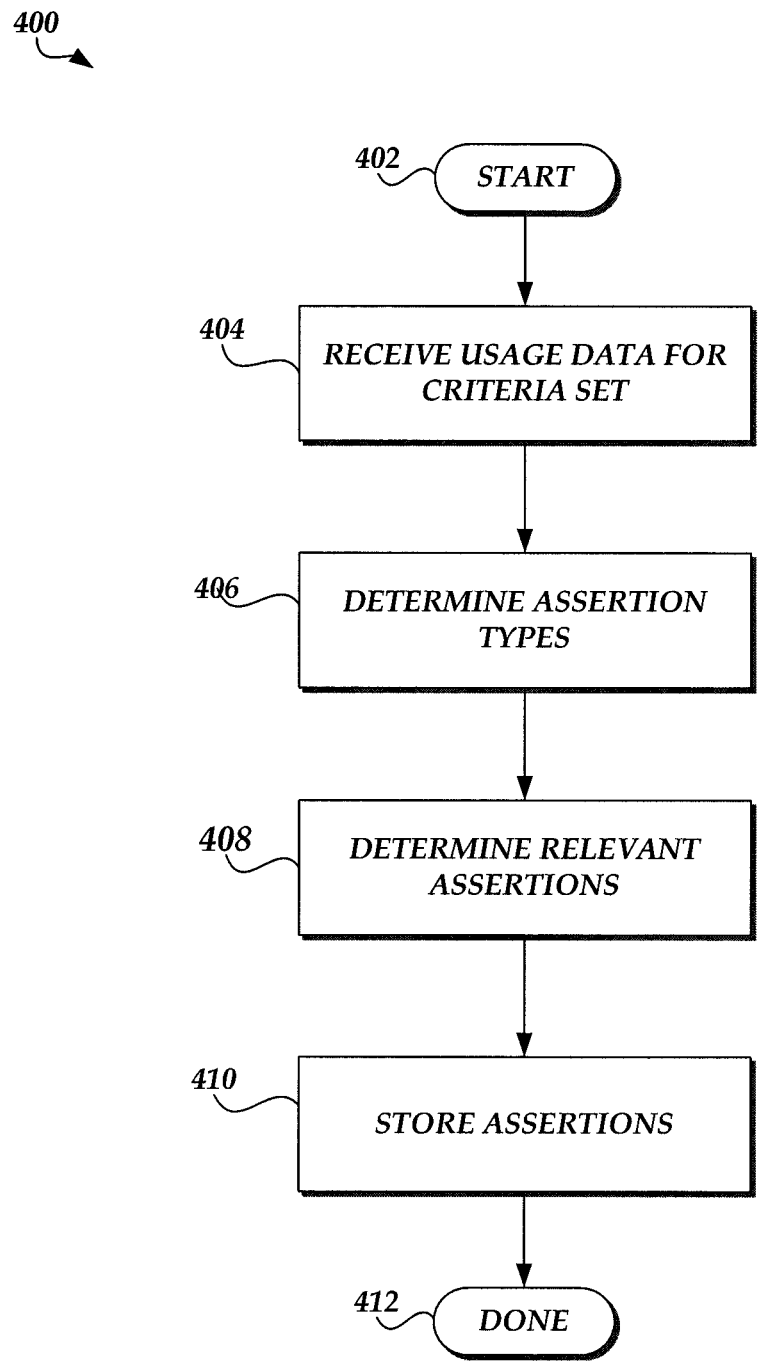
FIG. 4 is a flow diagram depicting an illustrative routine for generating assertions based at least in part on activities of traveler computing devices of FIG. 1.

With reference now to FIG. 4, one illustrative routine 400 for generation of assertions based on usage information will be described. The illustrative routine 400 may be carried out, for example, by the assertion discovery module 160 of FIG. 1. In some embodiments, the routine 400 may be carried out in real-time, such that assertions may be generated based at least in part on a traveler's query, and that the generated assertions may be made available immediately or substantially immediately to the querying traveler. In other embodiments, the routine 400 may be carried out periodically, such as once per day, to generate assertions based on the previous days usage activity.

Further, in some embodiments, the routine 400 may be carried out with respect to a single search. For example, the routine 400 may be implemented in order to generate assertions for travel from a first City A to a second City B on a given date. In other embodiments, the routine 400 may be carried out with respect a variety of searches. Illustratively, the routine 400 may be implemented in order to generate assertions for travel from City A to City B on any date within a given month. Still further, in some embodiments, usage information may be divided into a number of categories (e.g., business travelers, leisure travelers, elite travelers, etc.). In some such embodiments, the routine 400 may be implemented repeatedly for each relevant category.

At block 404, usage data relevant to the desired assertion set may be retrieved (e.g., from the usage information data store 164 of FIG. 1). For example, where assertions are desired for travel from a first City A to a second City B on a given date, usage data may include any user activity stemming from searches for travel from City A to City B on the given date. Similarly, where assertions are desired for travel from City A to City B on any date within a given month, usage data may include any user activity stemming from searches for travel from City A to City B in the given month. In some embodiments, retrieved usage information may be limited in order to increase potential relevancy, to decrease required computational power, or both. For example, retrieved usage information may be limited to traveler activities over a specific past period of time (e.g., 30 days).

Thereafter, at block 406, one or more assertion types may be determined. As described above, in some embodiments, assertion types may be specified manually for each query type. Illustratively, for queries regarding flight travel items, assertions types may include either alternative or more specific criteria relating to dates, times, depart locations or arrival locations, types of flights (e.g., non-stop, one-stop, multi-stop), or flight provider (e.g., airline). As a further example, with respect to hotels, assertions may include either alternative or more specific criteria relating to dates, hotel providers, room type, or location within a given destination (e.g., region or area of a city). Based on the manually specified assertion types, the routine 400 may attempt to determine any relevant usage activity (as reflected in the received usage data) which conforms to the specified type.

In other embodiments, assertion types may be automatically generated based on the aspects of travel items searched for or booked. For example, the routine 400 may inspect the usage data for any shared characteristics of a large number of user activities. For example, the usage data may reflect that over a threshold number or percent of activities share a specific characteristic (e.g., start date, end date, brand or provider, departure or arrival location, etc.). Because a large number of activities share such a characteristic, the routine 400 may determine that the characteristic should be included as an assertion type. Illustratively, hotels in or around a specific geographic location may not generally correspond to an assertion type. However, if a significant amount of usage activity indicates that hotels around the specific location are relevant to travelers, an assertion type may be created for hotels in or around the location.

Thereafter, at block 408, relevant assertions may be generated based at least in part on the usage data and on the determined assertion types. For example, where "non-stop flights" is determined to be an assertion type, the routine 400 may include a determination of what percentage of flights booked or searched for by travelers were "non-stop." Similarly, where an alternate destination was determined as an assertion type, the routine 400 may include a determination of what percentage of travel items booked or searched for where directed to a specific alternate destination. As described above, in some embodiments, assertions may be associated with relevancy thresholds. For example, an assertion may be determined to not be relevant if less than a threshold percentage or amount of travelers conducted the given activity. Illustratively, if only 4% of travelers searched for or booked travel items to a specific alternate destination, that activity might not qualify for creation of an assertion. In this manner, the overall number of assertions may be limited such that only activity by a significant number of travelers is reflected in the generated assertions.

Thereafter, at block 410, the generated assertions may be stored (e.g., in the assertion data store 162 of FIG. 1) for later retrieval. For example, generated assertions may be presented to a traveler computing device 110 in response to a search query, as will be described with respect to FIG. 5.

Figure 5:
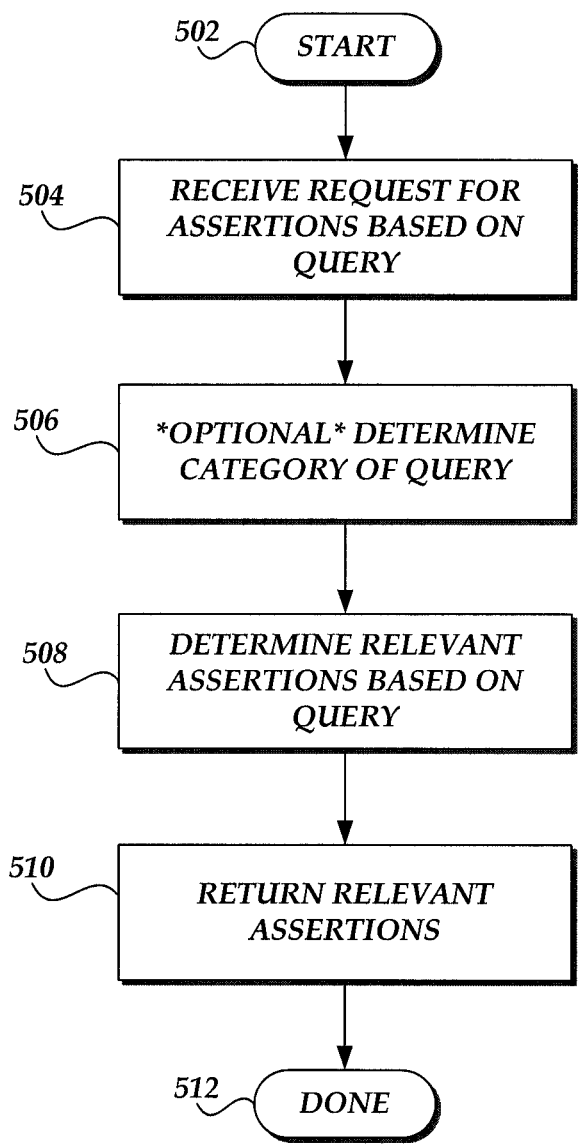
FIG. 5 is a flow diagram depicting an illustrative routine for selection and presentation of assertions to a querying traveler computing device of FIG. 1.

With reference now to FIG. 5, one illustrative routine 500 for presentation of assertions to a traveler computing device 110 described. The illustrative routine 500 may be carried out, for example, by the assertion discovery module 160 of FIG. 1. Specifically, the routine 500 may be carried out in response to user submission of a query for travel items in order to generate assertions relevant to the query.

Accordingly, at block 504, a request for assertions based at least in part on a submitted query may be received at the assertion discovery module 160. Illustratively, the request may be received from a user interface module 156 of FIG. 1 in response to submission of the query by a traveler computing device 110.

As described above, in some embodiments, user activity may be divided into a number of categories, such as business searches, leisure searches, or searches by elite users. As such, in these embodiments, the assertion discovery module 160 may, at block 506, be configured to determine a category of the received query. Generally described, categorical assignment of a search query may be based on similar criteria to categorization of user activity in general. Such criteria includes, but is not limited to, the query itself (e.g., search terms, dates, destinations, etc.), prior activity of the traveler, and profile information of the traveler. Based on the determined category, the assertion discovery module 160 may be configured to return those assertions relevant to the specific category.

Thereafter, at block 508, assertions relevant to the submitted query are determined. In some embodiments, assertions may have previously been generated and stored (e.g., in assertion data store 162 of FIG. 1). In these embodiments, block 508 may correspond to retrieving assertions relevant to the current query from the data store. In other embodiments, the assertion discovery module 160 may be configured to return assertions in real-time, or in substantially real-time. In such embodiments, the assertion discovery module 160 may be configured to determine relevant assertions immediately or substantially immediately, such as by implementation of the routine 400 of FIG. 4, described in more detail below. In either instance, assertions relevant to the current submitted query may be determined at block 508.

In some embodiments, multiple sets of assertions may be relevant to a specific search query. For example, in some embodiments, a submitted query may correspond to multiple categories. Illustratively, a traveler query may correspond to a "business" category and an "elite" category, as well as a combination of the two (e.g., a "business elite" category). Accordingly, assertions relevant to the "business elite" category may be most relevant to the traveler, while assertions relevant to the "business" category are slightly less relevant, and assertions relevant to the "elite" category are slightly less relevant still. Further, assertions of each of the above categories may be more relevant to the traveler than assertions corresponding to no category (e.g., general assertions). Accordingly, in some embodiments, where multiple sets of assertions are determined to be relevant to a received query, the assertion discovery module 160 may be configured to determine only a subset of relevant assertions to be presented to the traveler computing device 110. For example, the assertion discovery module 160 may be configured to attempt to return only the most relevant assertions to the traveler computing devices 110. In some such embodiments, a hierarchy of relevance may be established for assertion sets. For example, the assertion discovery module 160 may be configured to attempt to first display assertions corresponding to a combination of specific travel dates as well as a specific categorization (e.g., "business," "elite business," etc.), before attempting to display assertions corresponding to the specific travel date without the categorization. In some embodiments, display of assertions may be based at least in part on a prioritization of the assertions. For example, specific categories of assertions may be prioritized relevant to other categories of assertions. After determination of the most relevant assertions, the routine 500 may proceed at block 510, where relevant assertions are returned to the traveler computing device 110. Examples of user interfaces for presentation of such assertions are described above with respect to FIGS. 3A-3C.

Though not shown in FIG. 5, as described above, the assertion discovery module 160 and/or the user interface module 156 may be configured to determine additional information regarding assertions, such as an average or lowest price of travel items corresponding to the assertion or another difference between items corresponding to the assertion and items returned by the current query. Accordingly, in some embodiments, routine 500 may be modified to retrieve information regarding items corresponding to a determined relevant assertion (e.g., by interaction with the reservation systems interface module 152, usage monitoring module 158, and/or other components of the travel service 150). Information regarding these items may be returned in conjunction with the relevant assertions for presentation to the user. Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An example storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer implemented method for providing assertions in response to a travel item query, the method comprising:
    as implemented by one or more computing devices configured with specific executable instructions,
        receiving usage data reflective of user activity on a travel service, the user activity comprising a plurality of queries for travel items offered by the travel service;
        for a set of search criteria, determining, based at least in part on the usage data, a plurality of assertions, each of the plurality of assertions representative of a modified set of search criteria determined based at least in part on a previous action of at least one user taken in response to previously presented query results corresponding to the set of search criteria, and wherein each assertion of the plurality of assertions is selectable by an additional user to generate a new query based at least in part on the modified set of search criteria corresponding to each assertion;
        receiving, from a user computing device, a query corresponding to the set of search criteria;
        transmitting, to the user computing device, a display page including results of the query corresponding to the set of search criteria and the plurality of assertions associated with the set of search criteria;
        receiving selection of an assertion of the plurality of assertions by the user computing device, wherein the selection of the assertion corresponds to a user request to generate the new query based at least in part on the modified set of search criteria;
generating the new query based at least in part on the modified set of search criteria; and
transmitting results of the new query to the user computing device.

2. The computer implemented method of claim 1, wherein a travel item corresponds to at least one of a flight, an accommodation, ground transportation, activities, tours, travel insurance, day trips, or destination services.

3. The computer implemented method of claim 1, wherein the user activity corresponds to at least one of searching for travel items or acquiring a travel item.

4. The computer implemented method of claim 1, wherein generating the new query based at least in part on the modified set of search criteria comprises modifying, within the query received from the user computing device, at least one of a departure date or time, a departure location, an arrival date or time, an arrival location, a number of stops, a number of travelers, a preferred level of service, and a preferred provider of the travel item.

5. The computer implemented method of claim 1, wherein the assertion is associated with a categorization of the user activity.

6. The computer implemented method of claim 5, wherein the categorization of the user activity corresponds to at least one of business, leisure, family, elite, luxury, or economy.

7. A system for providing assertions regarding an item query, the system comprising:
at least one data store configured to store assertions, wherein each assertion is representative of at least one search criterion, and wherein the at least one search criterion is determined based at least in part on a previous action of at least one user taken in response to results of a previously executed query, and wherein each assertion is selectable by an additional user to generate a new query based at least in part on modified set of search criteria corresponding to each assertion; and
one or more processors in communication with the at least one data store, the one or more processors configured to:
receive, from a user computing device, a query including search criteria;
determine an assertion of the stored assertions that is relevant to the received query based at least in part on the search criteria;
transmit, to the user computing device, a display page including results of the query and the assertion that is relevant to the query;
receive a user selection of the assertion, wherein the user selection of the assertion corresponds to a user request to generate a new query based at least in part on modifying the search criteria included within the received query in accordance with the at least one search criterion represented by the assertion;
generate the new query based at least in part on modifying the search criteria included within the received query in accordance with the at least one search criterion represented by the determined assertion; and
transmit results of the new query to the user computing device.

8. The system of claim 7, wherein the received query corresponds to a query for one or more travel items.

9. The system of claim 7, wherein each of the stored assertions is further associated with a categorization of the previous action corresponding to the stored assertion.

10. The system of claim 7, wherein the one or more processors are further configured to determine a categorization of the received query based at least in part on the search criteria included within the received query.

11. The system of claim 10, wherein the determination of assertion relevant to the received query is further based at least in part on the determined categorization of the received query.

12. The system of claim 7, wherein the categorization of the received query is further based at least in part on at least one of past activity of the user computing device, a user profile associated with the user computing device, or acquisition history of a user associated with the user computing device.

13. The system of claim 7, wherein the previous action corresponds to at least one of searching for an item or acquiring an item.

14. The system of claim 7, wherein the one or more processors are further configured to determine additional information regarding items corresponding to the assertion.

15. The system of claim 7, wherein the additional information comprises at least one of an average price of the items corresponding to the one or more assertions, a lowest price of an item corresponding to the assertion, and a difference in price between an item corresponding to the assertion and an item corresponding to the received query.

16. A non-transitory computer readable storage medium having computer executable instructions for providing assertions regarding an item query, wherein the computer executable instructions, when executed by a computing system, cause the computing system to:
maintain one or more assertions, wherein each assertion is representative of at least one search criterion, and wherein the at least one search criterion of each respective assertion is determined based at least in part on a previous action of at least one user taken in response to results of a previous query, and wherein each assertion is selectable by an additional user to generate a new query based at least in part on a modified set of search criteria corresponding to each assertion;
determine a query including search criteria based at least in part on activity of a user computing device;
determine at least one of the one or more assertions relevant to the query;
transmit, to the user computing device, a display page including results of the query and the at least one assertion that is relevant to the query;
receive a user selection of the at least one assertion, wherein the user selection of the at least one assertion corresponds to a user request to generate a new query based at least in part on modifying the search criteria included within the received query in accordance with the at least one search criterion represented by the at least one assertion;
generate the new query based at least in part on modifying the search criteria included within the received query in accordance with the at least one search criterion represented by the at least one assertion; and
transmit results of the new query to the user computing device.

17. The non-transitory computer readable storage medium of claim 16, wherein the previous action corresponding of each of the one or more assertions corresponds to activity of a contact of the user associated with the user computing device, and wherein the contact corresponds to at least one of a contact on a travel service, a contact on a social networking service, or a contact within an address book of the user associated with the user computing device.

18. The non-transitory computer readable storage medium of claim 16, wherein the computer executable instructions further cause the computing system to generate the one or more assertions based on received usage data, and wherein the usage data reflects previous actions of users taken in response to results of previous queries.

19. The non-transitory computer readable storage medium of claim 18, wherein generation of the one or more assertions comprises a determination of an action taken by users at least a threshold number of times.

20. The non-transitory computer readable storage medium of claim 18, wherein generation of the one or more assertions comprises a determination of an action taken by at least a threshold percentage of users in response to the previous queries.

21. A computer implemented method for providing assertions regarding an item query, the method comprising:
as implemented by one or more computing devices configured with specific executable instructions,
determining an assertion associated with a set of search criteria and representative of a modification of the set of search criteria, and wherein the modification of the set of search criteria is determined based at least in part on a previous action of at least one user taken in response to results of a previous query, and wherein the assertion is selectable by an additional user to generate a new query based at least in part on the modification of the set of search criteria corresponding to the assertion;
determine a query including the set of search criteria based at least in part on activity of a user computing device;
generate a user interface comprising results, corresponding to the determined query including the set of search criteria, and the assertion representative of the modification of the set of search criteria; and
transmit the user interface to the user computing device, wherein user selection of the assertion corresponds to a user request to generate a new query based at least in part on the modification of the set of search criteria represented by the assertion and enables generation of the new query based at least in part on the modification of the set of search criteria represented by the assertion.

22. The computer implemented method of claim 21, wherein the determined assertion corresponds to a first assertion, and wherein the computer implemented method further comprises determining a second assertion corresponding to the set of search criteria and determining a prioritization of the first and second assertions.

23. The computer implemented method of claim 21, wherein determining the assertion is based at least in part on usage data reflective of the previous action of the at least one user taken in response to the results of the previous query.

24. The computer implemented method of claim 21 further comprising receiving a user selection of the assertion and generating the new query based at least in part on the modification of the set of search criteria represented by the assertion.

25. The computer implemented method of claim 21, wherein the determined query is at least one of an explicit query and an inferred query.

\* \* \* \* \*